United States Patent [19]
Sakamoto

[11] Patent Number: 5,283,636
[45] Date of Patent: Feb. 1, 1994

[54] IMAGE READER AND IMAGE READING METHOD

[75] Inventor: Takashi Sakamoto, Kyoto, Japan

[73] Assignee: Dainippon Screen Mfg. Co., Ltd., Kyoto, Japan

[21] Appl. No.: 735,726

[22] Filed: Jul. 25, 1991

[30] Foreign Application Priority Data

Jul. 25, 1990 [JP] Japan ............ 2-196592

[51] Int. Cl.$^5$ ............ H04N 1/46
[52] U.S. Cl. ............ 358/527; 358/505; 358/474; 356/443
[58] Field of Search ............ 358/75, 80, 76, 474, 358/475, 482, 483, 480; 356/443–445; 382/65; 359/894; H04N 1/46, 1/40

[56] References Cited

U.S. PATENT DOCUMENTS

| | | | |
|---|---|---|---|
| 3,153,698 | 10/1964 | Hall et al. | 358/80 |
| 4,319,268 | 3/1982 | Yamada | 358/75 |
| 4,465,375 | 8/1984 | Sakamoto | 356/434 |
| 4,536,803 | 8/1985 | Hennig | 358/474 |
| 4,613,896 | 9/1986 | Takita et al. | 358/76 |
| 4,844,288 | 7/1989 | Cho | 358/447 |

FOREIGN PATENT DOCUMENTS

| | | |
|---|---|---|
| 0098319 | 7/1982 | European Pat. Off. |
| 59-141871 | 8/1984 | Japan |
| 61-27683 | 6/1986 | Japan |

Primary Examiner—Edward L. Coles, Sr.
Assistant Examiner—Jill Jackson
Attorney, Agent, or Firm—Lowe, Price, LeBlanc & Becker

[57] ABSTRACT

The present invention relates to an image reader, such as a color image scanner, which can enhance outline of shapes that occur in an original image 2. The image reader in accordance with the present invention comprises a main-aperture board set 102 at a location on which lights from a light source which are reflected by or pass through the original image 2 and then pass through a lens 8, are focused. A transmission part 104 of the main-aperture set 102 comprises a first transmission part 108 and a second transmission part 110, which is adjacent to the first transmission part 108, the first transmission part 108 being used to transmit lights corresponding to all of the center part of a small area of the original image 2, the second transmission part 110 being used to transmit some of the lights corresponding to the rest of said small area with the quantity of said transmitted lights decreasing according to the increased distance from center C of the first transmission part 108. Therefore, graininess in the original image 2 is offset to substantially decrease its effect. As a result, the possibility of graininess reading, reproduction or enhancement is reduced without worsening a good reading resolution.

16 Claims, 17 Drawing Sheets $S_G$

U $K(S_G - U)$ $S_G + K(S_G - U)$ a1 a2

F I G. 7
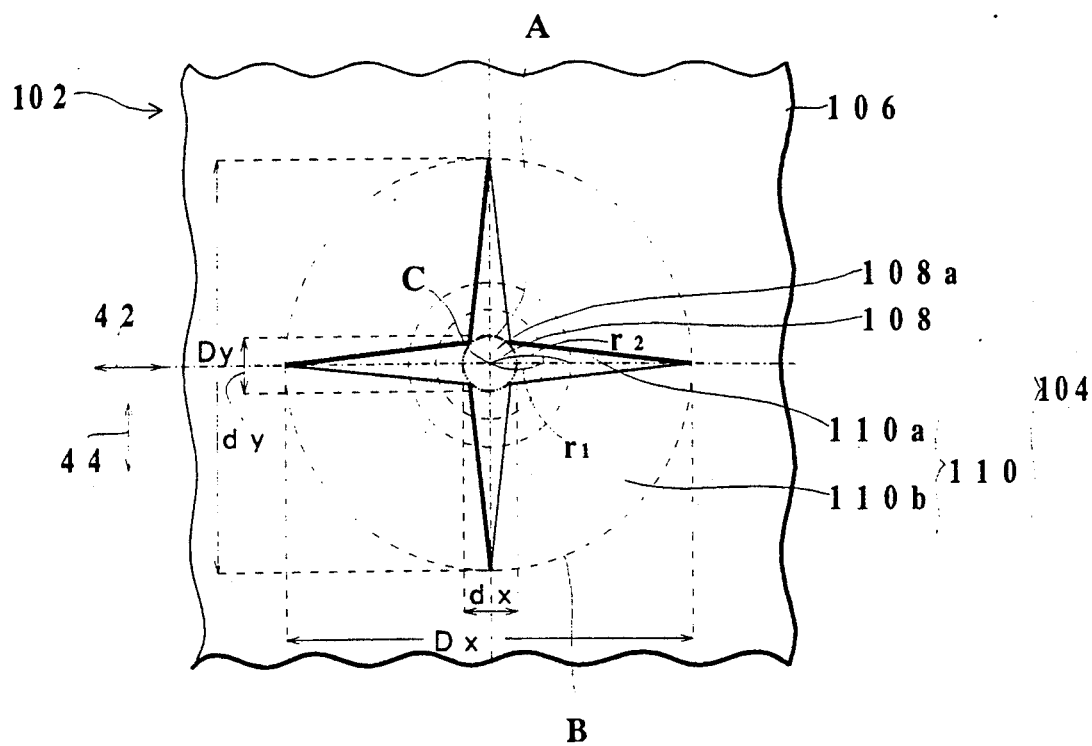
F I G. 8
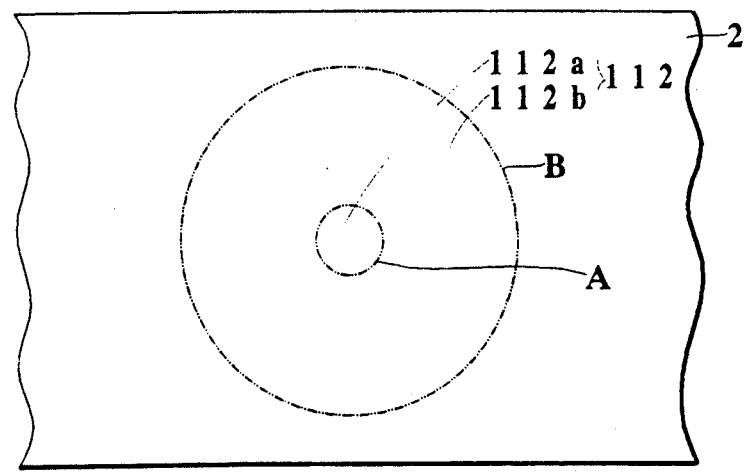

IMAGE READER AND IMAGE READING METHOD

BACKGROUND OF THE INVENTION AND RELATED ART STATEMENT

This invention relates to an image reader such as a color image scanner.

As shown in FIG. 1, in conventional image scanners, like cylindrical type scanners, an original image to be read, for example, a film image 2, is wound around a transparent cylinder 4 which rotates about a rotation axis 3 (in the primary scanning direction). An inner light source (not shown) for illuminating a small area of the film image 2 is located inside the cylinder 4. A scanning head 6 is located outside the cylinder 4. The scanning head 6 comprises a pickup lens 8, a half mirror 10, a main aperture board set 12, a sub-aperture board set 14, dichroic mirrors, 16, 18, and 20, for red (R), green (G) and blue (B) respectively, filters, 22, 24, and 26 for R, G, and B respectively, a filter 28 for an unsharp signal (for G filter, for example), photomultipliers 30, 32, 34, and 36 working as a photoelectric transfer device for providing electric signals responsive to the quantity of received lights, and an outer light source (not shown). The scanning head 6, integrated with the inner light source (not shown), shifts gradually in the direction of the rotation axis 3 (in a secondary scanning direction) in synchrony with the rotation of the cylinder 4. While scanning the film image 2 in both the primary scanning direction 42 and the secondary scanning direction 44, the pickup lens 8 forms an image of a small area of the original film image 2 onto both the main aperture board set 12 and the sub-aperture board set 14.

As shown in FIG. 2A and FIG. 2B, the main aperture board set 12 has a transmission part 46 which forms from a square or round opening. The diameter of the transmission part 46 is normally kept small for better reading resolution. The diameter of the transmission part 46 is adjusted, depending on an enlargement ratio (usually within a range from 20% to 2000%) employed in reproducing the original image. The smaller the enlargement ratio being used, the larger the diameter needs to be set. Conversely, the larger the enlargement ratio, the smaller the diameter is set.

Again referring to FIG. 1, lights from the pickup lens 8, reflected by the half mirror 10, are directed to the transmission part 46, which allows the lights corresponding to the center part of a small area of the original image 2 to pass through. The lights are then separately directed to photomultipliers 30, 32, and 34, after being separated into three colors by means of dichroic mirrors 16, 18 and 20, and filters 22, 24, and 26. The sub-aperture board set 14 and the main aperture board set 12 have an equal-location relationship; for example, the distance between the sub-aperture board set 14 and the half mirror 10 is nearly identical to the distance between the main aperture board set 12 and the half mirror 10. As shown in FIG. 3A and FIG. 3B, the sub-aperture board set 14 comprises a transmission part 48, which has a square or round opening, the size of which is larger than that of the transmission opening 46 on the main aperture board set 12. The function of the transmission part 48 is to enhance the outline of shapes in the original image.

Again referring to FIG. 1, the lights, after passing through the half mirror 10, are directed onto the transmission part 48, which allows lights corresponding to the wide part, thereby including the above-mentioned center part, of a small area of the original image to pass through. After passing through the transmission part 48, the lights corresponding to the wide part, are directed to the photomultiplier 36 via a filter 28. The output of the photomultipliers 30, 32 and 34 is directly related to the input level of the R, G and B components. The output signals are separately amplified in a logarithmic manner by the logarithmic amplifiers 50, 52 and 54 respectively. Assuming that an original image, such as the dark-light pattern indicated in FIG. 4A, is scanned in the primary scanning direction 42, the high-resolution sharp signals, SR, SG, and SB for the R, G, and B components, are obtained as shown in FIG. 4B. (Note that FIG. 4B shows only the sharp signal SG.)

The sharp signal SG is generally used by itself, for reasons of convenience, as the sole outline enhancing signal, on the assumption that it represents the other sharp signals as well.

Occasionally, an outline enhancing signal is also used which may be obtained by weight averaging the three sharp signals for R, G, and B.

Further, assuming that the original dark-light pattern image indicated in FIG. 4A is scanned in the primary scanning direction 42, the low-resolution unsharp signal U is obtained as shown in FIG. 4C. In FIG. 1, an operational amplifier 58 subtracts the unsharp signal U from the sharp signal SG. A potentiometer 60 adjusts the level, or multiplies the resulting signal (SG−U), by an adjusting factor K, thus putting out (k(SG−U)) as the outline enhancing signal. FIG. 4D indicates that the level of the resulting outline enhancing signal (k(SG−U)) varies largely in the vicinities of a and b in FIG. 4A, where a dark area and a light area meet. The adders 62, 64, and 66 add the outline enhancing signal (k(SG−U)) to SR, SG, and SB respectively as in FIG. 1. FIG. 4E is an example showing the outline enhanced signal (SG+k(SG−U)). With the cylinder 4 rotating, a clock pulse is provided. Synchronized to the clock pulse, the analog-to-digital (A/D) converters 68, 70, and 72 convert the outline enhanced signals from analog to digital form. The pitch of the primary scanning and secondary-scanning directions needs to be adjusted in accordance with the enlargement ratio desired. Note that the pulse interval of the clock pulse determines the pitch of the main scanning.

As mentioned above, conventional image readers allow the lights corresponding to the center part of a small area of the original image to pass through the transmission part of the main aperture board set. High-resolution and excellent-quality sharp signals thus result.

However, conventional image readers have the disadvantage that, because of their high reading resolution, they also read graininess (magnified by the pickup lens) of a size greater than, or even nearly equal to, the size of the transmission part opening of the main aperture board set. If the original image is on film, the following problem arises:

The sensitive material of the film image is made up of small particulate (diameter is 2μ or smaller, that have a white color) scattered as in FIG. 5A. One technical difficulty is producing particulate of sensitized material that are uniform in size, and another technical difficulty is to distribute them uniformly. Some areas have a dense distribution of these particles, while other areas have relatively few (both types of areas are usually about 10μ–20μ in size). Magnifying an image reveals this type of unevenness, therefore, resulting in graininess.

When a sharp signal is generated with a small enlargement ratio, as in the case when a full-size reading is performed, the diameter of the transmission part opening of the main aperture board set is large (as indicated by the circle α1 in FIG. 5A). Since this large diameter transmission part opening allows lights from the original image to pass through, the unevenness of the particle distribution is rectified, resulting in an excellent registration of the original film image.

When the sharp signal is generated with a large enlargement ratio, the transmission part opening of the main aperture set is small (as indicated by the circle α2 in FIG. 5B). Since this small diameter transmission part opening allows lights from the original image to pass through, the graininess passes through as well, without any rectification. The sharp signal level is low when the areas with a low density of particles are scanned as in FIG. 5C. The sharp signal level is normal when areas with a uniform distribution of particles are scanned as in FIG. 5D. The sharp signal level is high when areas with a high concentration of particles are scanned as in FIG. 5E.

When the small transmission part openings are used for scanning, as in FIG. 2A and FIG. 2B, graininess, which is an area of high concentration of particles, appears. Such graininess is read unmodified. If the outline is being enhanced, the graininess is enhanced as well.

As an alternative to the above, the large diameter transmission part opening of the main aperture board set may be used even with a high enlargement ratio setting, in order not to read the graininess. FIG. 6A shows the sharp signal, with the film image 2 scanned with the transmission part opening size equivalent to 5μ×5μ on the original image. FIG. 6B shows the sharp signal, with the film image 2 scanned by the transmission part size equivalent to 10μ×10μ on the original image. FIG. 6C shows the sharp signal, with the film 2 scanned by the transmission part size equivalent to 20μ×20μ on the original image. These figures mean that the large diameter transmission part opening of the main aperture board set allows passage to the wide part of the lights from both densely and dispersively distributed areas, rectifying unevenness of particulate distribution and lowering the possibility of reading graininess.

When the large diameter transmission part opening of the main aperture board set is employed, resolution of the sharp signal is lowered because of the passage of the wide part of the lights.

SUMMARY OF THE INVENTION

It is an object of the present invention to overcome the foregoing problem. The present invention provides an image reader which reduces the effect of reading graininess without affecting reading resolution.

An image reader in accordance with the present invention comprises:

(a) a light source for emitting lights to an original image;

(b) a pick-up lens for focussing said original image;

(c) a main-aperture board at a location on which lights from said light source which are reflected by or pass through said original image and then pass through said lens, are focused, said main-aperture board having a first transmission part and a second transmission part, which is adjacent to said first transmission part, said first transmission part being effective to transmit lights corresponding to a small area of said original image, said second transmission part being effective to transmit some of lights corresponding to the rest of said small area with the quantity of said transmitted lights decreasing according to the increased distance from said first transmission part;

(d) an imaging device for receiving lights from said first and second transmission part of said main-aperture board and generating a sharp signal according to quantity of said received lights;

(e) computing means for generating an unsharp signal from said sharp signal;

(f) enhancing means for modifying said sharp signals to enhance the outline of shapes that occur in said original image, on the basis of said sharp signals and said unsharp signals; and (g) means for generating said modified sharp signal as an image signal.

An image reader in accordance with the present invention comprises:

(a) a light source for emitting lights to an original image;

(b) a pick-up lens for focussing said original image;

(c) a main-aperture board at a location where lights from said light source, which are reflected from or passed through said original image and then pass through said lens, are focused, said main-aperture having a first transmission part and a second transmission part which is adjacent to said first transmission part, said first transmission part being effective to transmit lights corresponding to a small area of said original image, said second transmission part being effective to transmit some of lights corresponding to the rest of said small area with quantity of said transmitted lights decreasing according to increased distance from said first transmission part;

(d) a sub-aperture board at a location where lights from said light source, which are reflected by or pass through said original image, then pass through said lens and are focused, said sub-aperture board having a transmission part which is larger than said first transmission part of said main-aperture board;

(e) a reflection mirror for reflecting said lights from said light source which are reflected by or pass through said original image such that said main-aperture board and said sub-aperture board may receive said equivalent lights;

(f) a first imaging device and a second imaging device which respectively receive lights from said first and second transmission part of said main-aperture board and said transmission part of said sub-aperture board, and respectively generate a sharp signal and an unsharp signal according to the quantity of said received lights;

(g) enhancing means for modifying said sharp signals to enhance the outline of shapes that occur in said original image, on the basis of said sharp signals and said unsharp signals; and (h) means for generating said modified sharp signal as an image signal.

An image reader in accordance with the present invention comprises:

(a) a light source for emitting lights an original image;

(b) a pick-up lens for focussing said original image;

(c) a main-aperture board at a location on which lights from said light source which are reflected by or pass through said original image and then pass through said lens, are focused, said main-aperture comprising a first transmission part and a second transmission part, which is adjacent to said first transmission part, said first transmission part being effective to transmit lights corresponding to a small area of said original image, said second transmission part being effective to transmit some of the lights corresponding to the rest of said small area and having one or more opening cuts which radiate from said first transmission part;

(d) an imaging device for receiving lights from said first and second transmission part of said main-aperture board and generating a sharp signal according to quantity of said received lights;

(e) computing means for generating an unsharp signal from said sharp signal;

(f) enhancing means for modifying said sharp signals to enhance the outline of shapes that occur in said original image, on the basis of said sharp signals and said unsharp signals; and (g) means for generating said modified sharp signal as an image signal.

A method for reading images in accordance with the present invention comprises:

(a) directing the lights onto an original image from a light source;

(b) detecting the quantity of lights from said original image transmitted through a main-aperture board, said main-aperture board having a first transmission part and a second transmission part which is adjacent to said first transmission part, said first transmission part being effective to transmit lights corresponding to a small area of said original image, said second transmission part being effective to transmit some of the lights corresponding to the rest of said small area with the quantity of said transmitted lights decreasing according to the increased distance from said first transmission part;

(c) generating a sharp signal on the basis of the quantity of lights detected by step(b);

(d) detecting the quantity of lights transmitted through a sub-aperture board, said sub-aperture board having a transmission part which is larger than said first transmission part said main-aperture (e) generating an unsharp signal on the basis of the quantity of lights detected by step(d);

(f) modifying said sharp signal to enhance the outline of shapes occurred in said original image, on the basis of said unsharp signal; and (g) generating said modified sharp signal as an image signal. A method for reading images in accordance with the present invention comprises:

(a) directing lights onto an original image from a light source;

(b) detecting the quantity of lights from said original image transmitted through a main-aperture board, said main-aperture board having a first transmission part and a second transmission part which is adjacent to said first transmission part, said first transmission part being effective to transmit lights corresponding to a small area of said original image, said second transmission part being effective to transmit some of the lights corresponding to the rest of said small area with the quantity according to the increased distance from said first transmission part;

(c) generating a sharp signal on the basis of said detected quantity;

(d) computing an unsharp signals on the basis of said sharp signal;

(e) modifying said sharp signal to enhance the outline of shapes occurred in said original image, on the basis of said unsharp signal; and (f) generating said modified sharp signal as an image signal.

While the novel features of the invention are set forth in a general fashion, particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 7 is a view showing an embodiment of a main aperture board set according to the present invention.

FIG. 8 is a view showing a small area 112 of an original film image.

DETAILED DESCRIPTION OF THE PREFERRED EMBODIMENTS OF THE INVENTION

The present invention is described below according to the drawings.

Figure 1:
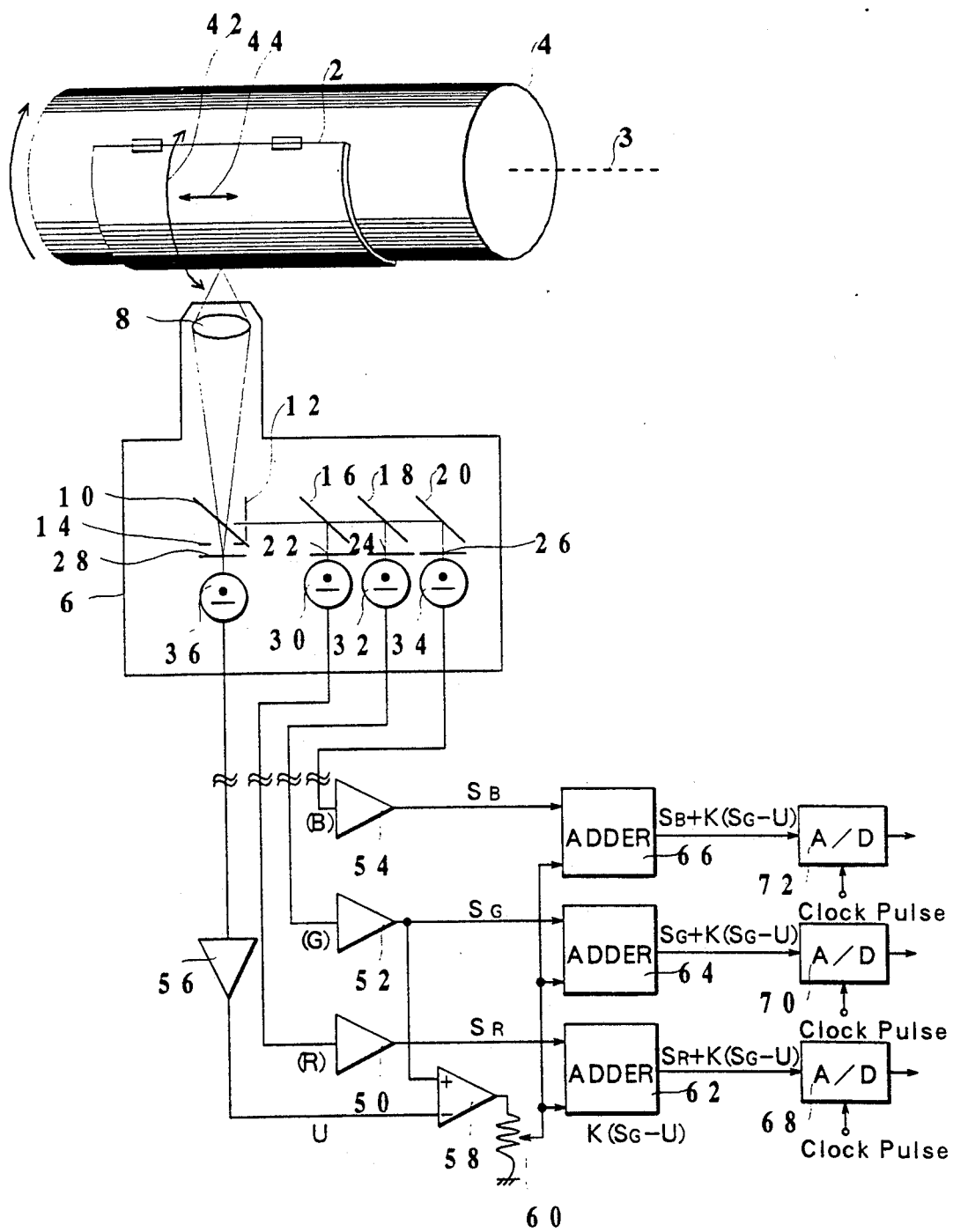
FIG. 1 is a view showing a conventional color image scanner.

When a member is common to FIG. 1, the same reference number is used (without further explanation) in the description that follows. Note that the present invention is common to the prior art, except the main aperture board set. FIG. 7 is a view showing an embodiment of the main aperture board set of the present invention. The main aperture board set 102 comprises a transmission part 104 and a shielding part 106 which cuts off lights completely. The transmission part 104 comprises a first transmission part 108 (the area enclosed by imaginary circle A), and a second transmission part 110 (the ring enclosed by the imaginary circle A and another imaginary circle B) adjacent to the first transmission part 108. The first transmission part 108 has an opening 108a which allows lights to pass through 100 percent. The second transmission part 110 has openings 110a which allow 100 percent of the lights to pass through, and a shielding part 110b which cuts off the lights completely. The opening cuts 110a run from the center C of the opening 108a, and are gradually narrowed along the primary scanning direction 42 and the secondary scanning direction 44. That is, a first opening ratio (that is, the ratio of the circumference part of a second circle with a radius r2 which the opening cuts 110a cut off, to the circumference of the second circle) is smaller than a second opening ratio (that is, the ratio of the circumference part of a first circle with a radius r1 (r2>r1) which the opening cuts 110a cut off, to the circumference of the first circle). This means that the quantity of lights passing through decreases with distance from the center C. The external diameter Dx of the second transmission part 110, along the primary scanning direction 42, is greater than the primary scanning pitch dx, and the external diameter Dy, of the secondary scanning direction 44, is greater than the secondary scanning pitch dy. The secondary scanning pitch means the distance the scanning head 6 travels in the secondary scanning direction 44 during the time the cylinder 4 takes to make one rotation.

The transmission part 104, of the main aperture board set 102, therefore permits lights corresponding to the center part 112a (the area enclosed by an imaginary circle A in FIG. 8) of the small area 112 (area enclosed by an imaginary circle B in FIG. 8) of the original film image 2, to fully pass through the first transmission part 108. Lights, corresponding to the surrounding area 112b (the ring enclosed by imaginary circle A and imaginary Circle B) surrounding the small area 112, are permitted to pass in both the primary and secondary directions only, and the quantity of lights permitted to pass is gradually decreased with their distance from the center C of the first transmission opening 108. As a result, the transmission part 104 can pass more image data, in both the primary scanning direction 42 and the secondary scanning direction 44, without increasing its diameter.

Figure 9:
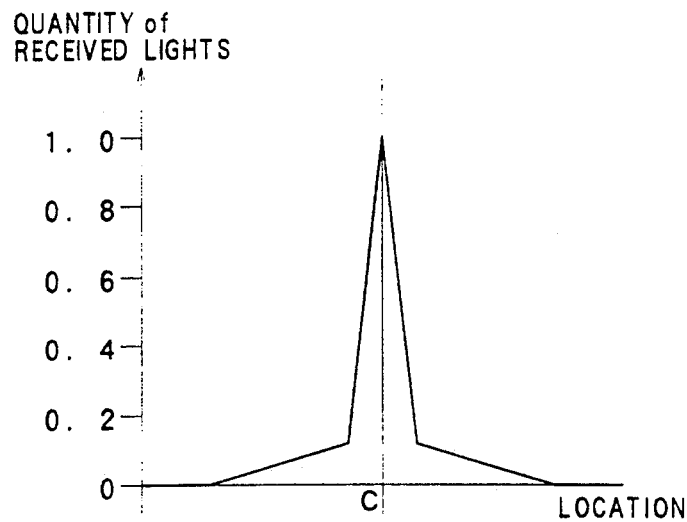
FIG. 9 is a diagram showing the quantity of received lights integrated along the secondary scanning direction 44 at each primary scanning 42, wherein the received lights pass through the center C of the transmission part 104.

FIG. 9 is a diagram showing the relationship between the quantity of lights received through the transmission part 104 and the location in primary scanning direction 42.

Figure 10:
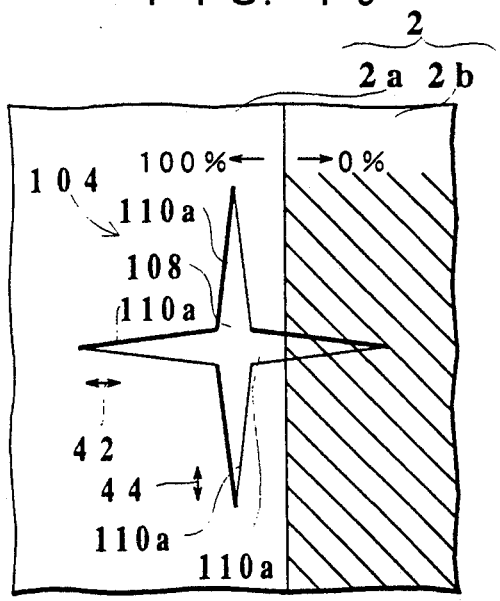
FIG. 10 is a view showing that the film image 2, made up of dark and light areas, is scanned in the primary scanning direction 42.
Figure 11:
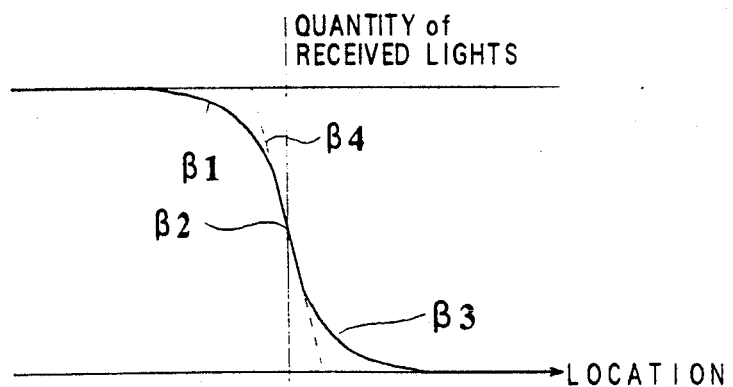
FIG. 11 is a diagram showing the quantity of lights received through the transmission part 104, when the film image 2 is scanned as in FIG. 10.

As shown in FIG. 10, it is now assumed that the film image 2, made up of a dark area 2b and a light area 2a, is scanned in the primary scanning direction 42 with the above-mentioned transmission part 104 of the main aperture board set 102. Since the front part of the opening cuts 110a of the second transmission part 110 scan the dark area 2b in the primary scanning direction 42, the transmission part 104 gradually passes fewer and fewer lights (as in FIG. 11 $\beta1$). Next both the opening cuts 110a in the secondary scanning direction 44, and the first transmission part 108 scan the dark area 2b, causing a sharp decrease in the lights passed (as in FIG. 11 $\beta2$). The back part of the opening cuts 110a, of the second transmission part 110, scans the dark area 2b in the primary scanning direction, causing a further gradual decrease in the lights passed (as in FIG. 11 $\beta3$). The above-mentioned method yields a marginally lower reading resolution, because of the front and back parts of the opening cuts 110a in the main scanning direction 42, than a method using the first transmission part 108 only, or another method using transmission part 46 of the conventional main aperture board sets shown in FIG. 2A and FIG. 2B. Reference is made to an imaginary line $\beta4$ in FIG. 11 for the lights pass characteristics of a conventional main aperture board set. The quantity of lights passed through the transmission part 46 is scaled to compensate and to match the quantity of lights passed through the transmission part 104 in FIG. 11. The lights passed through the opening cuts 110a gradually decrease with their distance from the center C (as indicated at $\beta1$ and $\beta3$ in FIG. 11), but their decrease is sharp at the border of a dark area 2b or a light area 2a (as indicated at $\beta2$ in FIG. 11). This keeps the resolution deterioration to a marginal level.

Figure 2A:
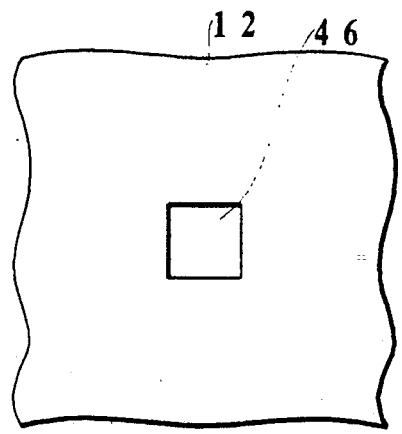
FIG. 2A and FIG. 2B are views showing conventional main aperture board sets.
Figure 2B:
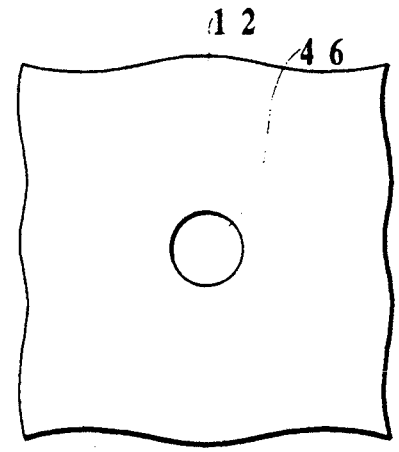
Figure 12A:
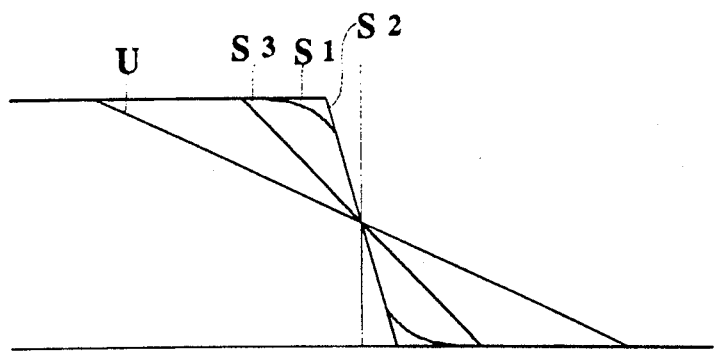
FIG. 12A through FIG. 12C are diagrams showing a sharp signal, an unsharp signal, an outline enhancing signal and an outline enhanced signal.
Figure 12B:
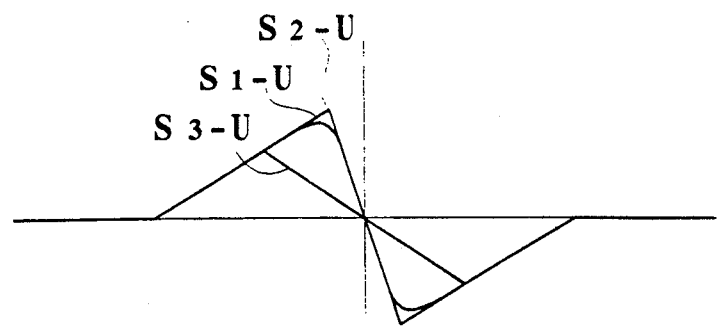
Figure 12C:
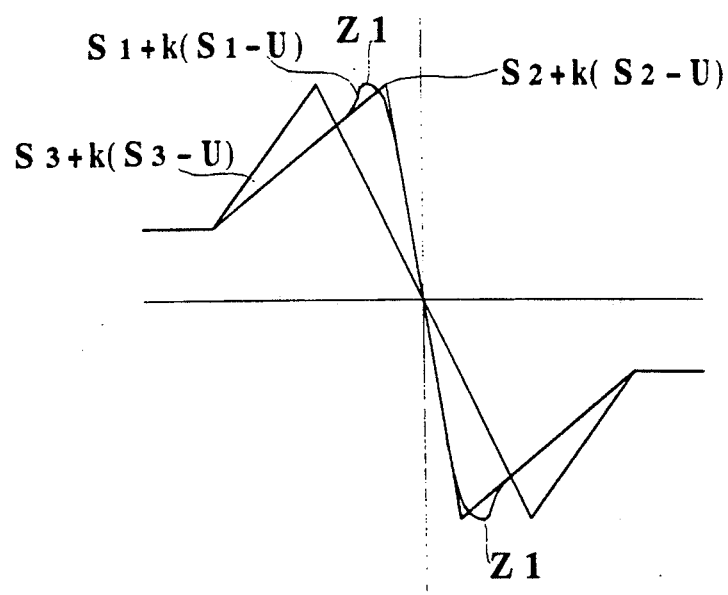

FIG. 12A, FIG. 12B and FIG. 12C shows a sharp signal (S1), an outline enhancing signal (S1−U) and an outline enhanced signal (S1+k(S1−U)) respectively. The sharp signal (S1) is obtained by detecting the quantity of lights passed through the transmission part 104 of the main aperture board set 102. When only the first transmission part 108, or a small diameter transmission part 46 as shown in FIG. 2A or FIG. 2B is used, the above signals are designated as follows: sharp signal (S2), outline enhancing signal (S2−U), and outline enhanced signal (S2+k(S1−U)). When a large diameter transmission part 46 is used, the above signals are designated as follows: sharp signal (S3), outline enhancing signal (S3−U), and outline enhanced signal (S3+k(S3−U)). The resulting outline enhanced signals show that deviation of the peak enhancement points is so marginal (as indicated at Z1 in FIG. 12C) that ringing (false outlines) does not take place. The outline enhancement is thus performed successfully.

Figure 13:
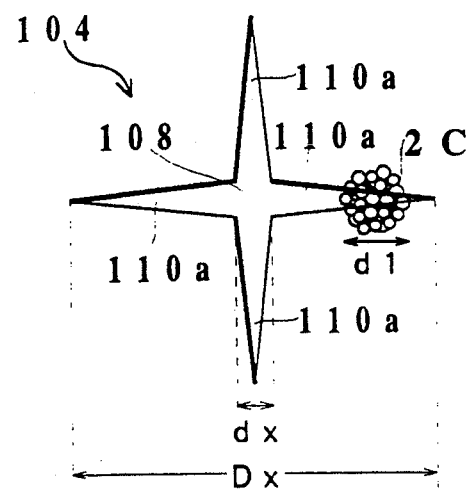
FIG. 13 is a view showing how a cluster 2c of particles is scanned in the primary scanning direction.

As shown in FIG. 13, it is now assumed that a film image 2, with a cluster 2c made up of particles, is scanned in the primary scanning direction 42, by the transmission part 104 of the main aperture board set 102. The area surrounding the cluster 2c is assumed to be uniformly dark. It is also assumed that the overall diameter d1 of the cluster 2c, is smaller than the diameter Dx of the second transmission part 110 in the primary scanning direction 42, nearly equal to the primary scanning pitch dx and nearly equal to the external diameter of the first transmission part 108.

Figure 14:
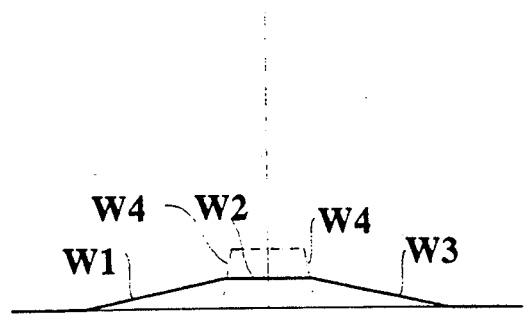
FIG. 14 is a diagram showing the quantity of received lights in FIG. 13.

First, the front part of the opening cuts 110a, of the second transmission part 110, scans the cluster 2c. As the cluster 2c approaches the center C, the area of the opening cuts 110a gradually increases in size, thus permitting more lights to pass through the transmission part 104 (as indicated at W1 in FIG. 14). Next, the first transmission part 108 scans the cluster 2c, and lights passing through the transmission part 104 reach their peak (as indicated at W2 in FIG. 14). The back part of the opening cuts 110a, of the second transmission part 110 in the primary scanning direction 42, scans the cluster 2c. As the cluster 2c moves away from the center C, the area of the opening cuts 110a gradually decreases in size, thus permitting fewer lights to pass through the transmission part 104 (as indicated at W3 in FIG. 14). Compared to the lights permitted to pass (see the imaginary line W4 in FIG. 14) when only the first transmission part 108, or small diameter transmission part 46, as shown in FIG. 2A or FIG. 2B is used, the lights permitted to pass through the transmission part 104 are less affected by graininess, due to the front and back parts of the opening cuts 110a. Even if the center C of the first transmission part 108 happens to exactly align with the center of the cluster 2c in the course of scanning, averaging the center and surrounding lights of the cluster 2c causes the grainy effect to be less pronounced and the cluster 2c becomes less noticeable. Therefore, the image signal, provided by integrating the lights permitted to pass through transmission part 104, is also less influenced by graininess in the film.

Figure 5A:
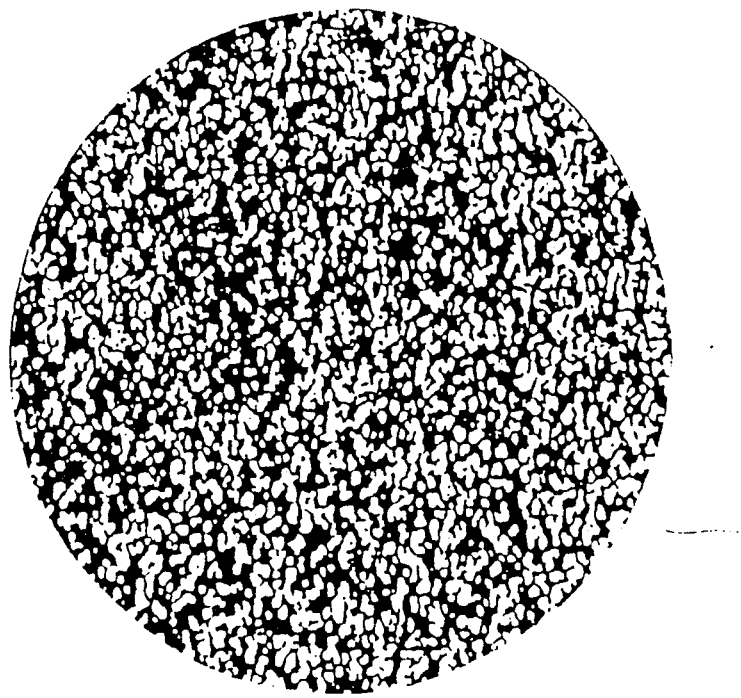
FIG. 5A through FIG. 5E are views describing graininess in an original film image.
Figure 5B:
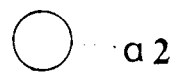
Figure 5C:
Figure 5C:
Figure 5D:
Figure 5D:
Figure 5E:
Figure 5E:
Figure 6A:
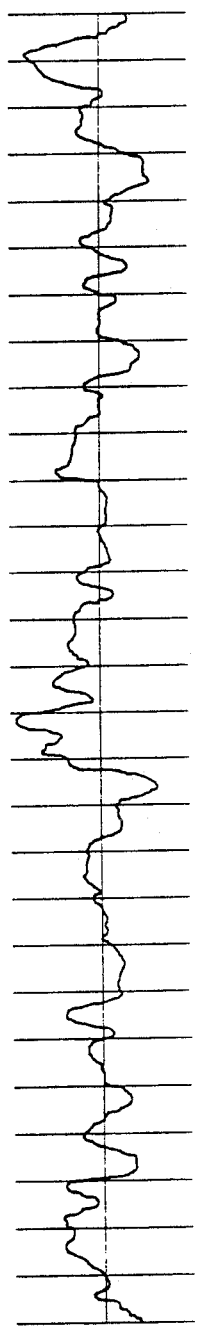
FIG. 6A through FIG. 6C are diagrams showing how the sharp signal changes according to changes in the diameter size of the transmission part opening when the same original film is scanned.
Figure 6B:
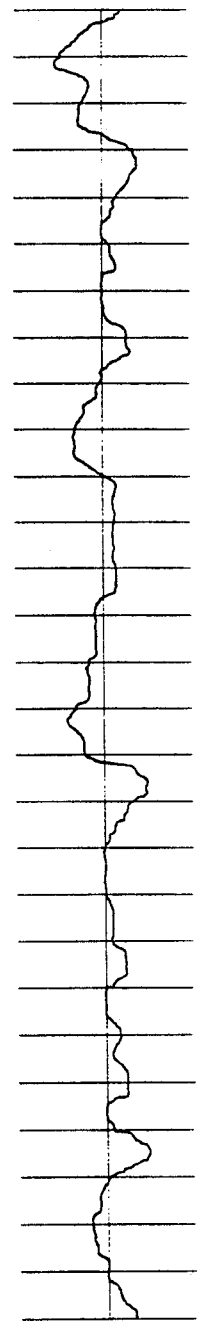
Figure 6C:
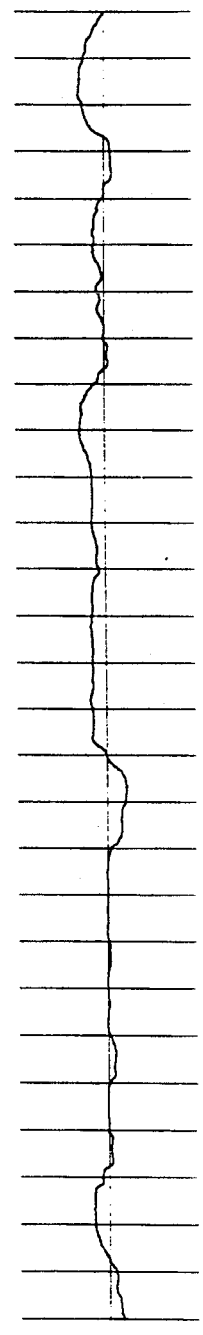
Figure 15:
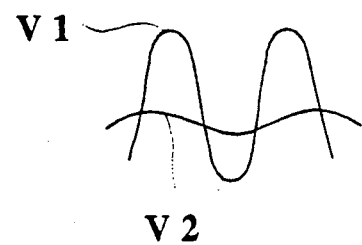
FIG. 15 is a diagram showing the sharp signal in FIG. 13.

In the case of uneven particle distribution shown in FIG. 5A, lights that pass through the first transmission part 108, change greatly as shown at V1 in FIG. 5, if only the first transmission part 108 is used. Since the second transmission part 110 is provided for in the present invention, lights that pass through the transmission part 104 change mildly as shown at V2 in FIG. 15. Thus, the cluster 2c is effectively unread because the outline enhancement function is not triggered by the cluster 2c.

The opening cuts 110a of the second transmission part 110 run in both the primary scanning direction 42 and the secondary scanning direction 44. The size of their openings gradually narrows with increasing distance from the center of the first transmission part. The above-mentioned configuration of the transmission part 104, allows more information to be received, both in the primary scanning direction 42 and in the secondary scanning direction 44. This arrangement outperforms another embodiment (see FIG. 20) described later, in outline reproduction characteristics, both in a horizontal line which agrees with the primary scanning direction 42, and in a vertical line which agrees with the secondary scanning direction 44. The reproduction characteristics in slanted directions are marginally affected, but they are generally more acceptable than changes in the reproduction characteristics in horizontal or vertical directions.

Figure 16:
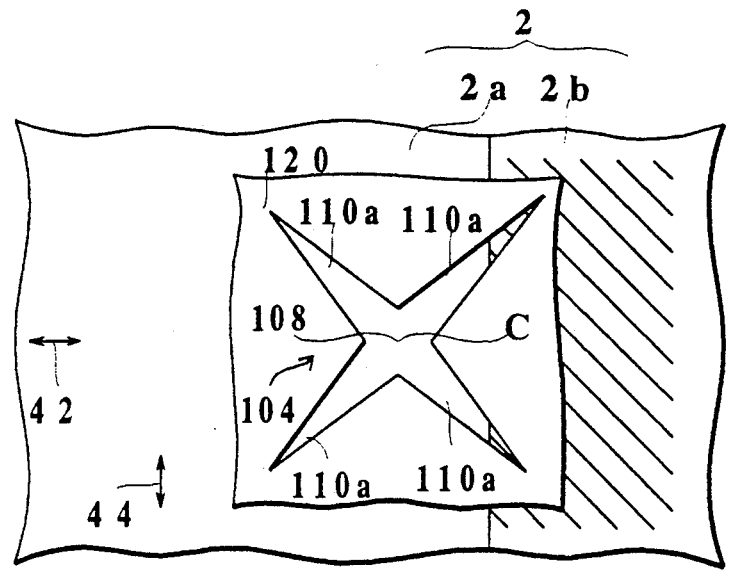
FIG. 16 is a view showing another embodiment of the main aperture board set, according to the present invention.

FIG. 16 shows another embodiment of the present invention. When a member is common to FIG. 7, FIG. 16 use the same reference number. It should be noted that the opening cuts 110a, of the second transmission part 110 on the main aperture board set 120, have their openings set at an angle of about 45° with respect to the primary scanning direction 42 and the secondary scanning direction 44. Such opening cuts 110a, pass lights corresponding to the surrounding part 112b of the small area 112 (see FIG. 8) both in the primary scanning direction 42 and in the secondary scanning direction 44, and the lights permitted to pass decrease with an increase in distance from the center C of the first transmission part 108. Without using a large diameter opening, the configuration of the opening cuts 110a allows more information in the middle, between the primary scanning direction 42 and the secondary scanning direction 44, to be received.

Figure 17:
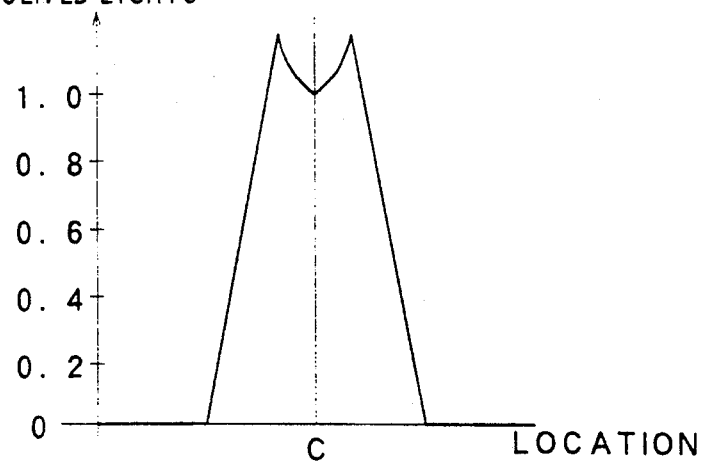
FIG. 17 is a diagram showing the quantity of received lights, integrated along the secondary scanning direction 44 for each primary scanning 42 pass, wherein the received lights pass through the center C of the transmission part 104.
Figure 18:
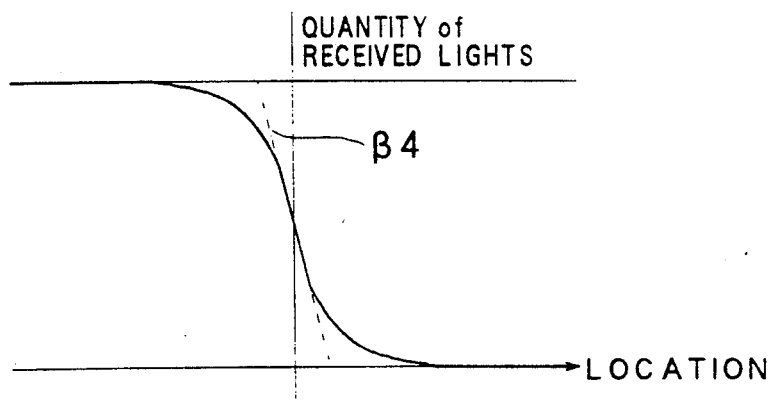
FIG. 18 is a diagram showing the quantity of lights received through the transmission part 104 when the film image 2, made up of dark and light areas, is scanned in the primary scanning direction 42.

Note that FIG. 17 is a diagram showing the relationship between the quantity of lights received through the main aperture board set 120 and the location in primary scanning direction. Note that FIG. 18 is a diagram showing the quantity of lights received through the transmission part 104 when the film image shown in FIG. 16, made up of dark and light area, is scanned in the primary scanning direction by the image reader utilizing the main aperture board set 120.

The opening cuts 110a, of the secondary transmission part 110, have their openings set in a direction that is in between the primary scanning direction 42 and the secondary scanning direction 44, and the size of their openings gradually decreases with increasing distance from the center C of the first transmission part. This embodiment therefore collects more information in a direction in between the primary scanning direction 42 and the secondary scanning direction 44, resulting in better outline reproduction characteristic in the slant directions than another embodiment (see FIG. 20) described later.

Figure 19:
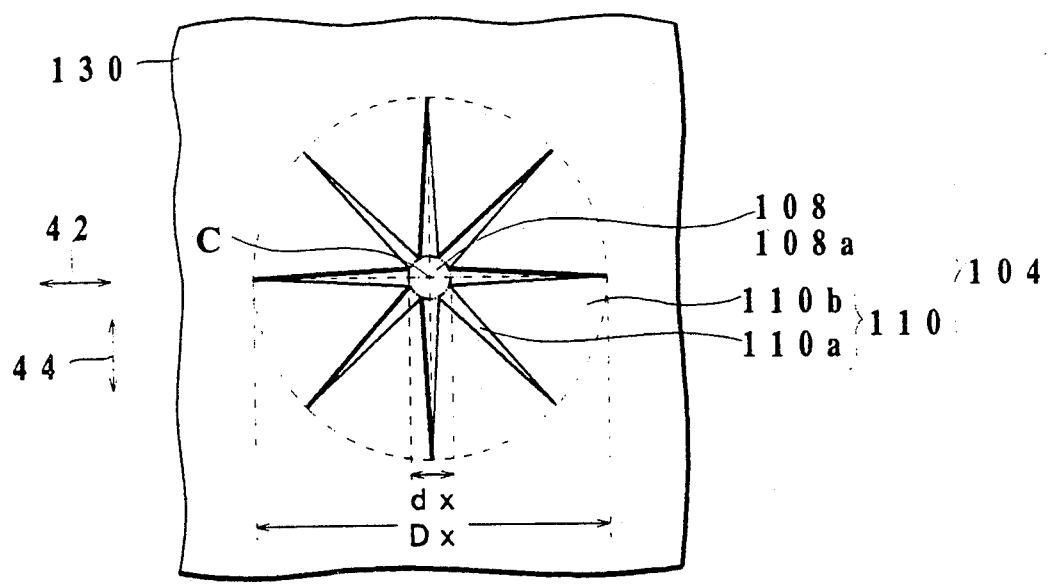
FIG. 19 is a view showing another embodiment of the main aperture board set, according to the present invention.

FIG. 19 shows another embodiment. When a member is common to FIG. 7 and FIG. 16, FIG. 19 uses the same reference number. It should be noted that the opening cuts 110a, of the second transmission part 110 on the main aperture board set 130, having openings oriented to both the primary scanning direction 42 and the secondary scanning direction 44, and also to the directions in between the primary direction 42 and the secondary direction 44. Such a configuration as above allows the transmission part 104 to collect more information both in the primary scanning direction 42 and the secondary scanning direction 44 and in the slant directions as well, providing better outline reproduction characteristics for vertical and horizontal as well as slanted lines.

Figure 20:
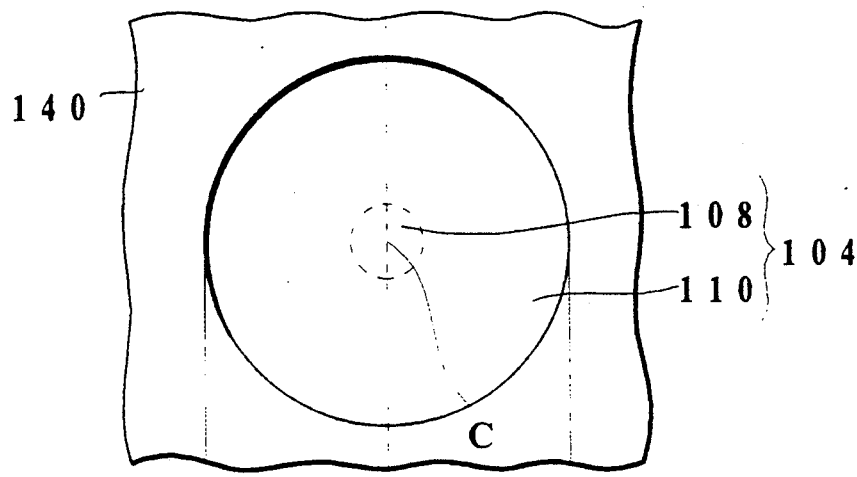
FIG. 20 is a view showing another embodiment of the main aperture board set, according to the present invention.

FIG. 20 shows another embodiment. When a member is common to FIG. 7 and FIG. 16, FIG. 20 uses the same reference number. It should be noted that the transmission part 104, of the main aperture board set 140, uses the first transmission part 108 and the second transmission part 110, both of which are photo-masked.

The first transmission part 108 is lightly photo-masked, allowing more lights to pass through. Meanwhile, with increasing distance from the center C, the first transmission part 108 gradually increases its photomask density, thus gradually decreasing the quantity of lights passing through. But the first transmission part 108 allows lights corresponding to the center 110a, of small area 112 of the original image, shown in FIG. 8, to fully pass through. The second transmission part 110 is more heavily photo-masked. With increasing distance from the center C, it is even more heavily photo-masked, thus decreasing the quantity of lights passed. The second transmission part 110, therefore, passes lights corresponding to the surrounding part 112b, of small area 112 of the original image, shown in FIG. 8, but the quantity of lights passed gradually decreases with increasing distance from the center C.

Figure 21:
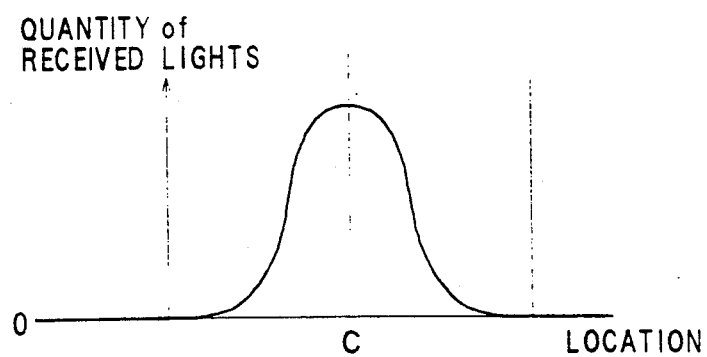
FIG. 21 is a diagram showing the relationship between the quantity of lights received through the transmission part 104 and the location in primary scanning direction 42.

FIG. 21 shows the relationship between the quantity of lights received through the transmission part 104 and the location in primary scanning direction 42. A transmission part 104 such as mentioned above may be produced using a photo duplication technique that makes a transparent film which has more lights directed towards its center and fewer and fewer lights striking points at increased distances from the center.

Therefore, the above-mentioned transmission part 104 can collect more image data omnidirectionally within the surrounding area 112b, without using a large opening. That is, outline reproduction characteristics are improved in all directions, inclusive of horizontal, vertical and slanted directions.

Meanwhile, the above embodiment is described assuming the image reader is a cylindrical/transmission type color scanner. But the embodiment may be applied to a reflection type, a plane table type, or even other types of image readers such as image scanners.

Figure 22A:
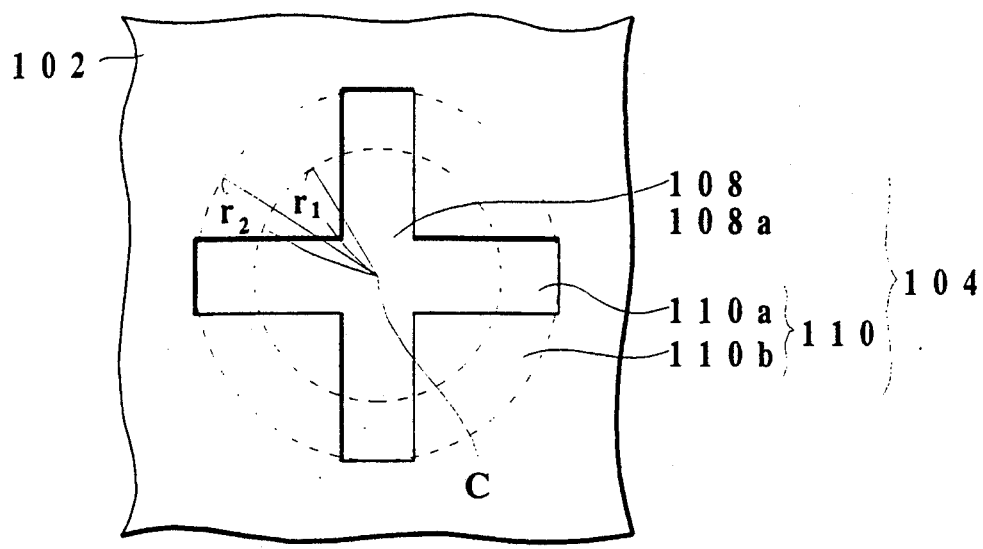
FIG. 22A and FIG. 22B are views showing the openings 110a of a second transmission part 110, according to the present invention.
Figure 22B:
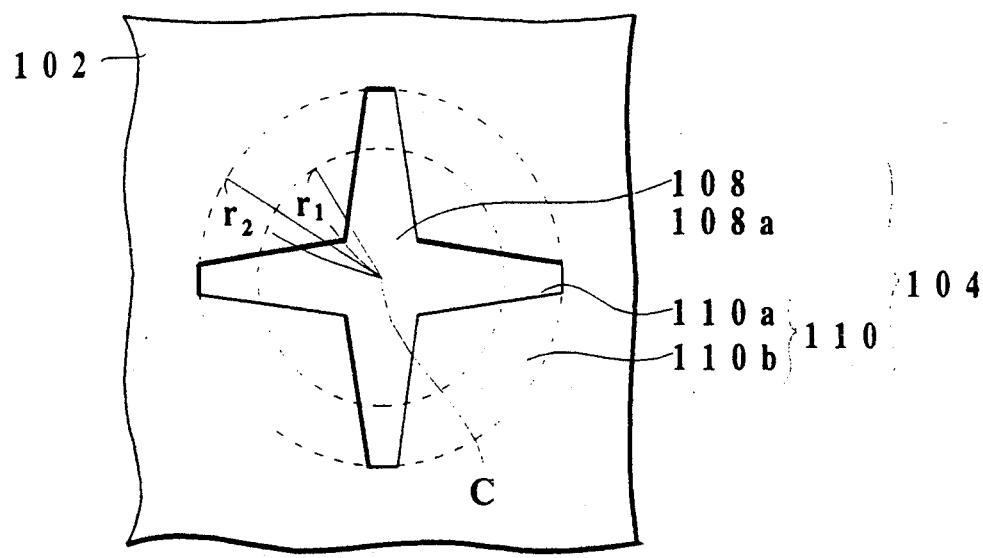
Figure 23A:
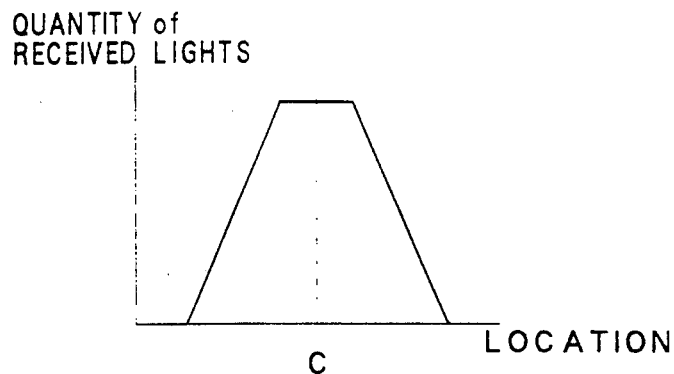
FIG. 23A through FIG. 23C are diagrams showing characteristics of the quantity of lights received through the photo-mask.
Figure 23B:
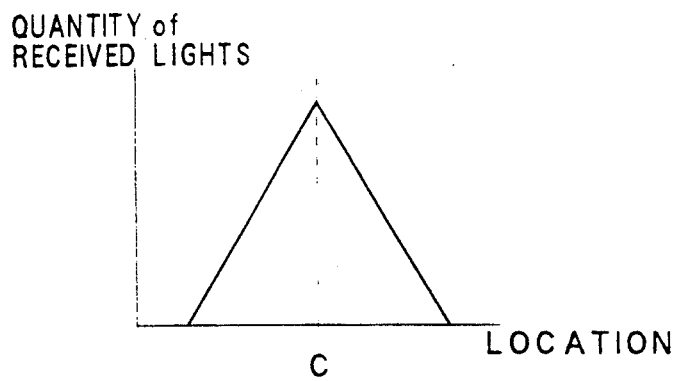
Figure 23C:
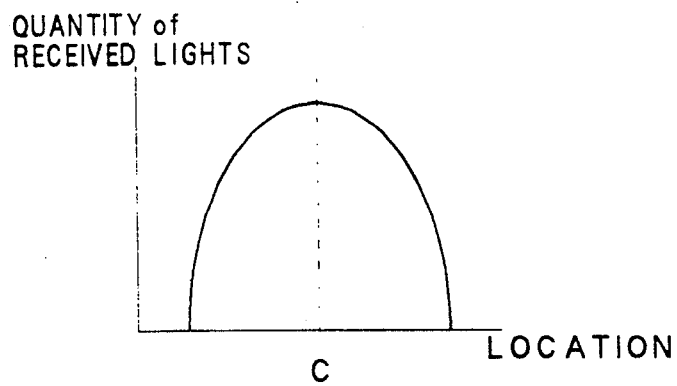

Although the opening cuts 110a of the second transmission part 110 are triangular in the above description, they may be rectangular (as in FIG. 22A), trapezoidal (as in FIG. 22B), or use any other shape which permits fewer lights to pass with increasing distance from the center C. In all above embodiments, the first transmission part and the second transmission part are continuously arranged, but a thin shielding part may be arranged between both parts. Note that in FIG. 22A where the opening cuts are rectangular, an first opening ratio (that is, the ratio of the circumference part of a second circle with a radius r2 which the opening cuts 110a cut off, to the circumference of the second circle) is smaller than an second opening ratio (that is, the ratio of the circumference part of a first circle with a radius r1 (r2>r1) which the opening cuts 110a cut off, to the circumference of the first circle). This means that the quantity of lights passing through decreases with increased distance from the center C. In the above embodiment, the transmission part 104 is so photo-masked that the quantity of lights agrees with the normal distribution of lights, with the center C. The photo-mask may be so made that the distribution of the quantity of lights is trapezoidal (as in FIG. 23A), triangular (as in FIG. 23B), parabolic (as in FIG. 23C) or any other shape.

Meanwhile, the first transmission part 108 may be made of an opening 108a and the second transmission part 110 be only photo-masked.

Figure 24:
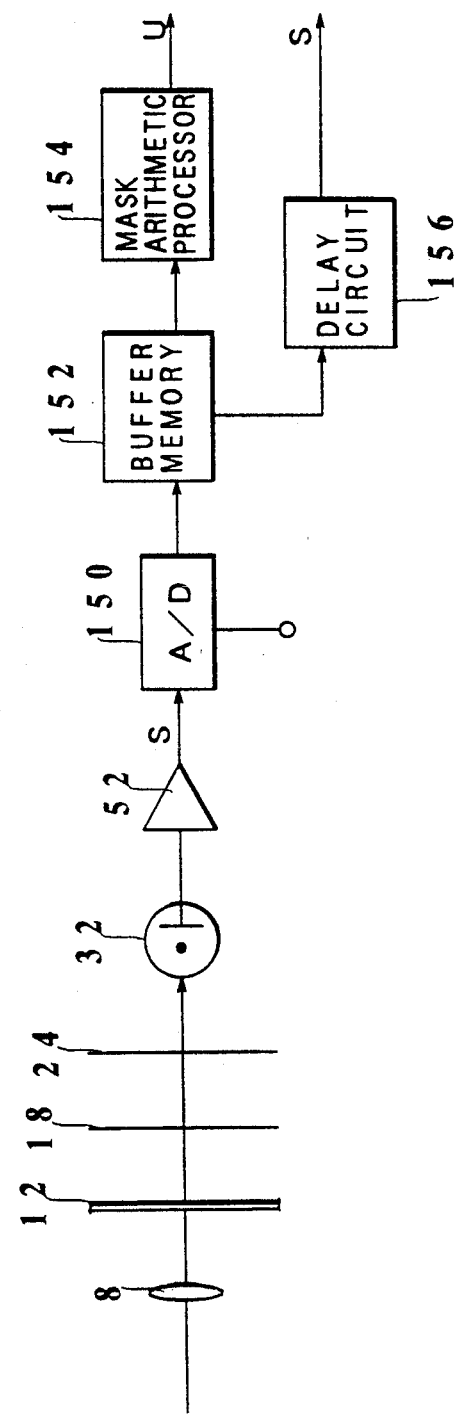
FIG. 24 is a block diagram for generating an unsharp signal from a sharp signal.
Figure 25A:
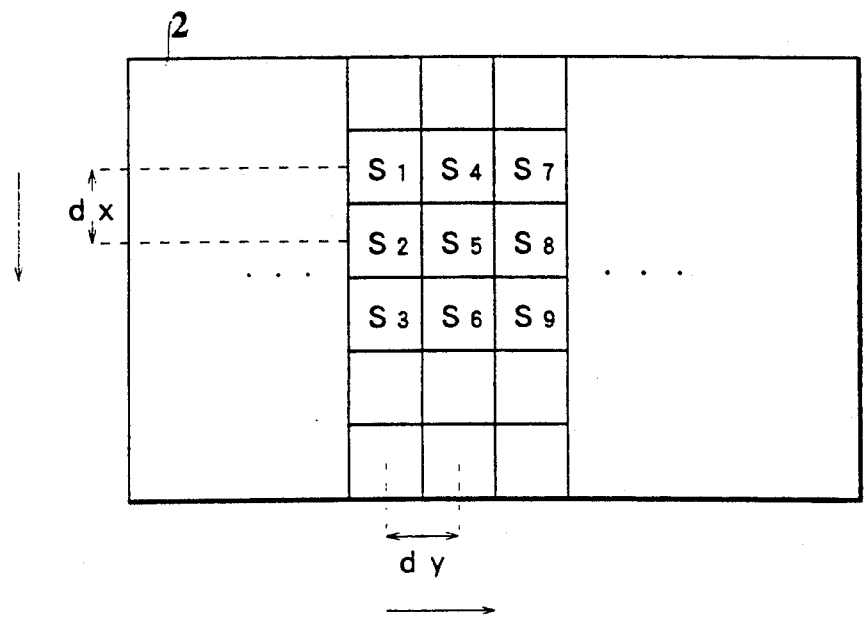
FIG. 25A through FIG. 25C are diagrams describing the operation of the above-mentioned block diagram.
Figure 25B:
Figure 25C:
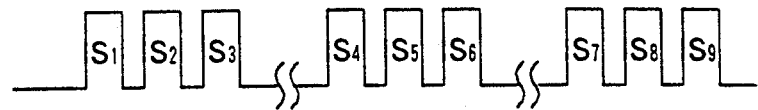

In the above embodiment, the unsharp signal is generated by means of the opening 48 of the sub-aperture board set 14. But the unsharp signal may be produced from the sharp signal. For example, the unsharp signal may be produced as follows:

At each clock signal, an A/D converter 150 converts the sharp signal (S) generated by the transmission part of the main aperture board set 12 from analog to digital form. The resulting digitized sharp signal (S) is stored in a buffer memory 152. Next, retrieving the sharp signal (S) from the buffer memory 152, a mask arithmetic processor 154 creates an unsharp signal by performing averaging or weight averaging operations. FIG. 24 shows a simplified for of the circuitry which Japanese Unexamined Patent 59-141871 discloses. As a small area of the original image is scanned (as in FIG. 25A), the buffer memory 152 stores a series of sharp signals S1-S3 ..., S4-S6 ..., S7-S9 ..., at each clock signal t1-t3 ..., t4-t6 ..., t7-79 (see FIG. 25B and 25C). If the sharp signal S5 is the sharp signal to be handled, the mask arithmetic processor 154 retrieves sharp signals S1-S3, S4-S6 and S7-S9, weights them and averages them, to produce an unsharp signal U5 corresponding to the sharp signal S5. Meanwhile the delay circuit 156 is provided in order to synchronize the sharp signal S5 with the unsharp signal U5.

Figure 3A:
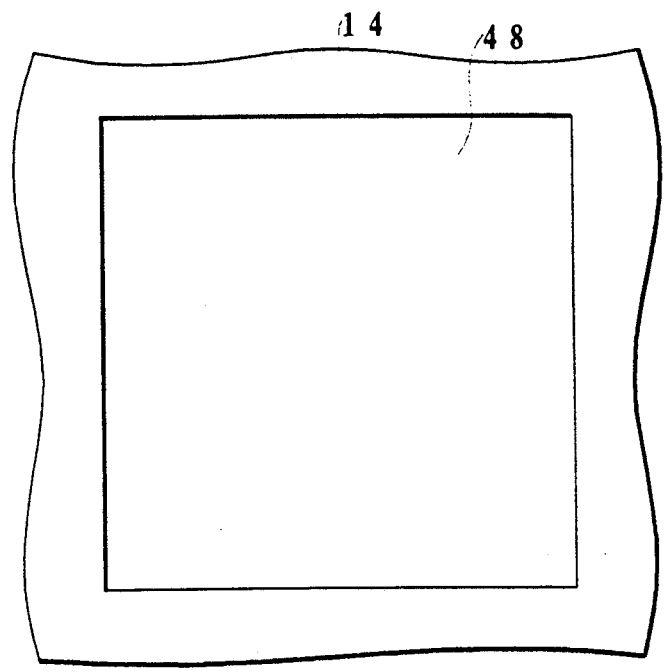
FIG. 3A and FIG. 3B are views showing sub-aperture board sets.
Figure 3B:
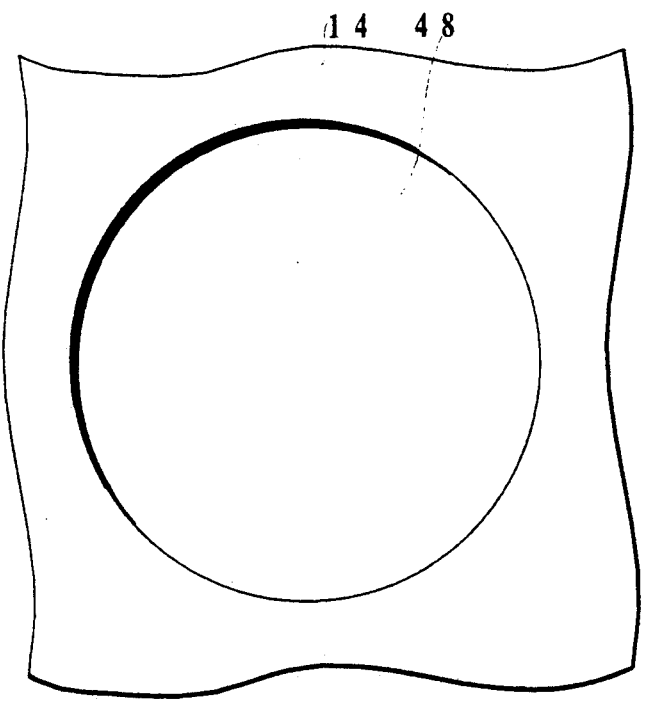
Figure 4A:
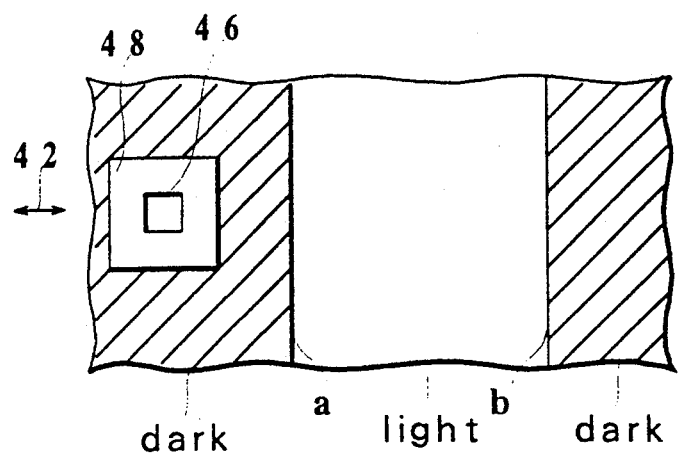
FIG. 4A through FIG. 4E are views showing dark-light pattern of an original image, a sharp signal, an unsharp signal, an outline enhancing signal, and outline enhanced signal.
Figure 4B:
Figure 4C:
Figure 4D:
Figure 4E:
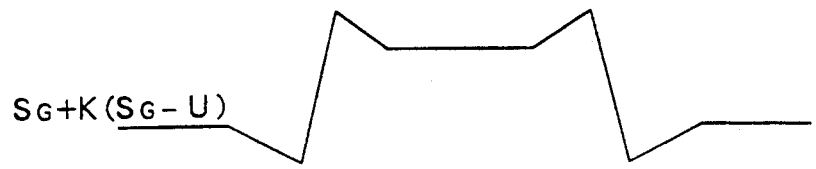

In another method where the unsharp signal is generated using a sub-aperture board set, the opening in the transmission part may be square or round as in FIG. 3A or FIG. 3B. Furthermore, the sub-aperture may be one which is similar to in configuration but larger than the transmission part opening in the main aperture board set. When the film graininess varies because of film differences from the film image manufacturers, it is advisable to adjust the size of the first transmission part 108 of the transmission part 104 in accordance with the enlargement ratio in use. Proper sizes for the first transmission part 108 and the second transmission part 110 are mainly related to, and thus determined by considering, the graininess of the original film image. Preparing several sizes of both parts, and several combinations of theses sizes as well, is advisable so that one of the combinations can be selected to match the enlargement ratio and the film graininess.

In the image reader according to the present invention, the transmission part of the main aperture board set is comprised of the first transmission part and the second transmission part, which is adjacent to the first transmission part, the first transmission part being used to transmit lights corresponding to all of center part of small area of the original image, the second transmission part being used to transmit some of lights corresponding to the rest of the small area, and quantity of the transmitted lights decreasing according to distance from the center of the first transmission part. Since both lights, corresponding to all of center part of small area of the original image, and some of the lights corresponding to the rest of the small area are collected, graininess in the original image is offset to substantially decrease its effect. As a result, the possibility of graininess reading, reproduction or enhancement is reduced. The opening of the transmission part is kept small enough to avoid a worsening of a good reading resolution.

Further, the first transmission part has an opening, and the second transmission part has one or more opening cuts which radiate from the center of first transmission part and are of a width which is fixed or decreases with increased distance from the line established by the center of the first transmission part. The production of the above transmission parts is easy enough; simply cut a main aperture board set, so that the first transmission part and the second transmission part are made according the desired shapes. A modification to the opening of existing transmission parts is also accomplished easily enough by cutting openings in the second transmission part.

Furthermore, the opening cuts of the second transmission part, running in the primary scanning and the secondary scanning directions, decrease in openness with increased distance from the center of the first transmission part. More information is picked up in the primary and secondary scanning directions, and thus better outline reproduction characteristics result for both horizontal lines aligned with the primary direction and for vertical lines aligned with the secondary direction.

Yet furthermore, the transmission part is shaped such that the primary direction's diameter of the transmission part is longer than the pitch of the primary scanning direction and the secondary scanning direction's diameter of the transmission part is longer than the pitch of the secondary scanning direction. Even if the overall diameter of a cluster of particles producing graininess is as large as or slightly greater than the primary scanning pitch or secondary scanning pitch, graininess or unevenness can be kept from being read by means of the second transmission part which picks up image information surrounding the cluster.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. A method of reading an original image by scanning said original image at a first scanning pitch in a primary scanning direction and a second scanning pitch in a secondary scanning direction, said secondary scanning direction being substantially orthogonal to said primary scanning direction, comprising the steps of:
   (a) directing a light onto said original image from a light source;
   (b) detecting a quantity of light from said original image transmitted through a main-aperture board, said main-aperture board having a first transmission part and a second transmission part which is adjacent to said first transmission part, said first transmission part being effective to transmit light corresponding to a small area of said original image, said second transmission part being effective to transmit some of the light corresponding to the rest of said small area with the quantity of said transmitted light decreasing according to increased distance from said first transmission part, said second transmission part shaped such that a size thereof in said primary scanning direction is longer than said first scanning pitch and a size thereof in said secondary scanning direction is longer than said second scanning pitch;
   (c) generating a sharp signal on the basis of the quantity of light detected by step (b);
   (d) detecting the quantity of light transmitted through a sub-aperture board, said sub-aperture board having a transmission part which is larger than said first transmission part of said main-aperture board;
   (e) generating an unsharp signal on the basis of the quantity of light detected by step(d);
   (f) modifying said sharp signal to enhance an outline of shapes in said original image, on the basis of said unsharp signal; and
   (g) generating said modified sharp signal as an image signal.

2. A method in accordance with claim 1 wherein; said first transmission part has an opening.

3. A method in accordance with claim 2 wherein; said second transmission part has one or more opening cuts which radiate from said first transmission part, each said opening cut having a width which is fixed or decreased according to distance from said first transmission part.

4. A method in accordance with claim 3 wherein; said opening cuts of said second transmission part are aligned with said primary and secondary directions of scanning.

5. A method of reading an original image by scanning said original image at a first scanning pitch in a primary scanning direction and a second scanning pitch in a secondary scanning direction, said secondary scanning direction being substantially orthogonal to said primary scanning direction, comprising the steps of:
   (a) directing light onto said original image from a light source;
   (b) detecting a quantity of light from said original image transmitted through a main-aperture board, said main-aperture board having a first transmission part and a second transmission part which is adjacent to said first transmission part, said first transmission part being effective to transmit light corresponding to a small area of said original image, said second transmission part being effective to transmit some of the light corresponding to the rest of said small area with the quantity of said transmitted light decreasing according to increased distance from said first transmission part, said second transmission part shaped such that a size thereof in said primary scanning direction is longer than said first scanning pitch and a size thereof in said secondary scanning direction is longer than said second scanning pitch;
   (c) generating a sharp signal on the basis of said detected quantity;
   (d) computing an unsharp signal on the basis of said sharp signal;
   (e) modifying said sharp signal to enhance an outline of shapes in said original image, on the basis of said unsharp signal; and
   (f) generating said modified sharp signal as an image signal.

6. A method in accordance with claim 5 wherein; said first transmission part has an opening.

7. A method in accordance with claim 6 wherein; said second transmission part has one or more opening cuts which radiate from said first transmission part, each said opening cut having a width which is fixed or decreased according to distance from said first transmission part.

8. A method in accordance with claim 7 wherein; said opening cuts of said second transmission part are aligned with said primary and secondary directions of scanning.

9. An apparatus for reading an original image by scanning said original image at a first scanning pitch in a primary scanning direction and a second scanning pitch in a secondary scanning direction, said secondary scanning direction being substantially orthogonal to said primary scanning direction, said apparatus comprising:

a light source for emitting light toward said original image;

a pick-up lens for focussing said light in a small area of said original image at a focussed point;

a main-aperture board, disposed at said focussed point, having a first transmission part effective to transmit said light corresponding to a center area of said small area and a second transmission part effective to transmit said light corresponding to said small area except said center area, wherein said second transmission part is formed such that a size thereof in said primary scanning direction is longer than said first scanning pitch and a size thereof in said secondary scanning direction is longer than said second scanning pitch, and the quantity of said light to be transmitted decreases according to a distance from said first transmission part;

an imaging device for receiving said light passing through said main-aperture board and for generating a sharp signal according to a quantity of the received light;

computing means for generating an unsharp signal from a plurality of said sharp signals;

enhancing means for modifying said sharp signal to enhance an outline of shapes in said original image, on the basis of said sharp signal and said unsharp signal; and means for generating said modified signal as an image signal.

10. An apparatus in accordance with claim 9, wherein said first transmission part has an opening.

11. An apparatus in accordance with claim 10, wherein said second transmission part comprises one or more opening cuts which radiate from said first transmission part, each said opening cut having a width which is fixed or decreased according to distance from said first transmission part.

12. An apparatus in accordance with claim 11, wherein said opening cuts of said second transmission part are aligned with said primary and secondary scanning directions.

13. An apparatus for reading an original image by scanning said original image at a first scanning pitch in a primary scanning direction and a second scanning pitch in a secondary scanning direction, said secondary scanning direction being substantially orthogonal to said primary scanning direction, said apparatus comprising:

a light source for emitting light toward said original image;

a pick-up lens for focussing said light in a small area of said original image at a focussed point;

a main-aperture board, disposed at said focussed point, having a first transmission part effective to transmit said light corresponding to a center area of said small area and a second transmission part effective to transmit said light corresponding to said small area except said center area, wherein said second transmission part is formed such that a size thereof in said primary scanning direction is longer than said first scanning pitch and a size thereof in said secondary scanning direction is longer than said second scanning pitch, and the quantity of said light to be transmitted decreases according to a distance from said first transmission part;

a sub-aperture board, disposed at said focussed point, said sub-aperture board having a transmission part which is larger than said first transmission part of said main-aperture board;

a reflection mirror for reflecting said light from said light source which is reflected by or passed through said original image such that said main-aperture board and said sub-aperture board may receive equivalent light;

a first imaging device for receiving light from said first and second transmission part of said main-aperture board and for generating a sharp signal according to a quantity of the light received thereby;

a second imaging device for receiving light from said and for generating an usharp signal according to a quantity of the light received thereby;

enhancing means for modifying said sharp signal to enhance an outline of shapes in said original image, on the basis of said sharp signal and said unsharp signal; and means for generating said modified sharp signal as an image signal.

14. An apparatus in accordance with claim 13, wherein said first transmission part has an opening.

15. An apparatus in accordance with claim 14, wherein said second transmission part comprise one or more opening cuts which radiate from said first transmission part, each said opening cut having a width which is fixed or decreased according to distance from said first transmission part.

16. An apparatus in accordance with claim 15, wherein said opening cuts of said second transmission part are aligned with said primary and secondary scanning directions.

* * * * *